United States Patent
Fischer et al.

(10) Patent No.: US 6,295,455 B1
(45) Date of Patent: Sep. 25, 2001

(54) METHODS AND ARRANGEMENTS FOR LOCATING A MOBILE TELECOMMUNICATIONS STATION

(75) Inventors: Sven Fischer, Nërnberg (DE); Ari Kangas, Uppsala (SE); Patrik Lundqvist, Solna (SE); Erik Larsson, Kista (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/332,282

(22) Filed: Jun. 11, 1999

(51) Int. Cl.⁷ ........................................................ H04Q 7/20
(52) U.S. Cl. ............................. 455/456; 342/450; 342/457
(58) Field of Search .................................. 455/456, 457, 455/422, 67.1, 67.6; 342/450, 457; 370/345, 347, 442

(56) References Cited
FOREIGN PATENT DOCUMENTS

| 96/25830 | 8/1996 | (WO) . |
| 99/27735 | 6/1999 | (WO) . |
| 99/49691 | 9/1999 | (WO) . |

*Primary Examiner*—Nay Maung
*Assistant Examiner*—Quochien B. Vuong
(74) *Attorney, Agent, or Firm*—Jenkens & Gilchrist, A Professional Corporation

(57) ABSTRACT

In a mobile telecommunications network, a mobile station (MS) is configured to generate and uplink transmit position measuring data prior to and/or during a call connection, without noticeably interrupting the user or degrading the quality of service provided. Position measuring data can be uplink transmitted over an idle traffic channel during a call set up operation for a brief moment while the call connection is being completed. Position measuring data can also be uplink transmitted during a call by selectively stealing data positions or burst positions in the uplink signal. The position measuring data is received by a plurality of base stations and uplink signal characteristics are measured and collected. The measured uplink signal characteristic data from several base stations is then used to determine a current approximate geographical location of the mobile station.

41 Claims, 5 Drawing Sheets

METHODS AND ARRANGEMENTS FOR LOCATING A MOBILE TELECOMMUNICATIONS STATION

TECHNICAL FIELD OF THE INVENTION

The present invention relates to a mobile telecommunications network and, more particularly, to improved methods and arrangements for determining the current geographic location of a mobile station within the coverage area of the mobile telecommunications network.

BACKGROUND

There is often a need to determine the geographical location of a calling party. For example, when a calling party contacts an emergency response service it is desirable to ascertain the geographical location of the calling party, thereby allowing emergency services to be dispatched or otherwise provided to the calling party in a timely manner.

Within a traditional wireline telecommunications network, determining the geographic location of a particular wireline subscriber is easy, because a physical circuit connection exists between the telecommunications exchange and the subscriber's telecommunications terminal. This physical connection inherently identifies the location of the associated wireline subscriber. Thus, for example, in response to a need to locate a wireline subscriber, the serving telecommunications exchange merely has to perform a line trace along the circuit connections to determine the location of the calling party subscriber. Alternatively, the serving telecommunications exchange can determine the directory number associated with the calling party subscriber (e.g., caller ID information). The ascertained directory number is associated with a particular access line (telephone line) that can then be translated into a geographic location.

With the popularity of mobile telecommunications increasing each year, there is an increased need for efficient and accurate locating methods and arrangements, especially for calls requesting emergency services. Indeed, within the United States of America, the Federal Communications Commission (FCC) recently mandated that all mobile telecommunications service providers provide the capability to determine the geographical location of a mobile station to within an accuracy of one hundred twenty-five (125) meters when they receive an emergency call.

Locating a subscriber in a mobile telecommunications network is much more difficult because the subscriber can move about the coverage area at will. By effectuating communication through a radio link, several of the associated mobile telecommunications exchanges can service the subscriber's mobile station during a single call. For example, a mobile station is often required to actively switch between cells during a call. This requires handover operations to occur between the mobile station (MS) and the various mobile switching centers (MSC), and/or base station controller (BSC) and associated base transceiver stations (BTSs) providing services to the cells. As a result, it is no longer sufficient to merely determine the associated directory number to ascertain the current location of the mobile station. Furthermore, no wireline circuit connection is available for purposes of ascertaining location data.

A number of methods and mechanisms have been introduced to determine the geographic location of a mobile station. For example, triangulation and/or arcuation methods that measure the signal strength received from three or more neighboring cells or base transceiver stations (BTSs) can be used to determine an approximate location of the mobile station.

Further triangulation and/or arcuation methods that measure the amount of time it takes for signals to travel between three or more neighboring cells or BTSs and the mobile station have been employed to determine an approximate location of the mobile station. For example, in certain systems, the mobile station is configured to measure a unique downlink time of arrival (TOA) for downlink signals transmitted from at least three different BTSs. The differences in the measured downlink TOAs are then processed to determine an approximate location of the mobile station. Unfortunately, a typical downlink TOA method requires significant additional processing capability within the mobile station, and/or that the mobile station provide the measured downlink TOA data to another network resource for additional processing.

As an alternative, in certain systems, the mobile station is configured to transmit a particular uplink signal to three or more BTSs or other receiving nodes, for example. Each of the receiving BTSs/nodes measures a unique uplink TOA for the uplink signal. This measured uplink TOA data is then processed to determine the approximate geographical location of the mobile station.

Unlike the downlink TOA method, this type of uplink TOA method can be accomplished without significant changes to the mobile station. For example, in certain systems, the uplink TOA method is accomplished by having the mobile station attempt a typical handover procedure. This usually does not require any changes to the mobile station. Basically, in such systems, the mobile station attempts to complete a handover operation by transmitting a plurality of standard access bursts, for example, about seventy access bursts. Certain BTSs/nodes that receive the uplink signal are configured to measure an uplink TOA based on the receipt time of the access bursts. The handover operation is not, however, completed and the mobile station remains within the service of the originally servicing BTS.

Unfortunately, there are some drawbacks associated with such an uplink TOA method and system. For example, the subscriber may experience a call or speech interruption as a result of an attempted handover operation. By way of example, in certain exemplary systems, the handover operation and corresponding measurement time for uplink TOA can last for over one-third of a second. Most subscribers can notice such a speech interruption. To make matters worse, there may be a need to conduct additional attempted handover operations if the initial handover operation fails to provide the proper quality and/or quantity of uplink signal characteristic measurements. Thus, for example, there is a potential for disturbing other calls if there are too many TOA uplink positioning events occurring at about the same time, especially when the access bursts associated therewith are transmitted by the mobiles stations at about full power (as is commonly done).

There is also an inherent burden on the associated mobile telecommunications resources to schedule and subsequently intentionally ignore handover attempts by the mobile station. These problems are further exacerbated as the number of mobile stations increases and consequently the number of attempted handover operations increases.

Moreover, even the aforementioned one-third of a second uplink signal characteristic measurement time may be inadequate, under certain conditions (e.g., no frequency hopping and a slowly moving or stationary mobile station), to optimize performance of conventional TOA measurements.

Accordingly, there is a need for improved uplink signal-based location methods and arrangements that significantly reduce or otherwise minimize the amount and/or number of interruptions detectable by the mobile station subscriber, are less burdensome on the network's resources, and provide additional measurement time.

SUMMARY OF THE INVENTION

The present invention provides improved and enhanced uplink signal-based location methods and arrangements that significantly reduce or otherwise minimize the interruptions detectable by a mobile station subscriber. These methods and arrangements also tend to be less burdensome on the network's resources than traditional handover operation-based TOA measurement techniques.

In accordance with certain aspects of the present invention, a mobile station is configured to generate and uplink transmit special position measuring data. This position measuring data can be uplink transmitted prior to and/or during a call connection without noticeably interrupting the user or degrading the quality of service provided. Thus, for example, position measuring data can be uplink transmitted over an idle traffic channel or other channel during a call set up or similar operation while the subscriber is waiting. Position measuring data can also be uplink transmitted during a call by selectively stealing data positions and/or burst positions in the uplink signal.

The uplink transmitted position measuring data is then received and used to determine an approximate geographical location of the mobile station, for example, by determining an angle of arrival, and/or time of arrival at a plurality of receivers having known geographical locations.

With this in mind, an arrangement is provided, in accordance with certain embodiments of the present invention, for use in determining an approximate geographical location of a mobile station within a coverage area of a mobile telecommunications network based on a plurality of uplink signal measurements associated with an uplink signal transmitted by the mobile station. The arrangement includes a mobile station configured to generate and transmit an uplink signal having a plurality of data bursts. The arrangement also includes a position measuring data generator configured to generate position measuring data and selectively replace portions of the uplink signal with at least portions of the position measuring data prior to transmission of the uplink signal. A plurality of receiving nodes are each configured to receive this uplink signal, detect the position measuring data therein, and measure at least one uplink signal characteristic (e.g., a time of arrival, angle of arrival, signal strength, etc.) associated with the receipt of the position measuring data. A mobile location center (MLC) then uses the measured time of arrival data associated with each of the receiving nodes to determine an approximate geographical location of the mobile station based on the measured uplink signal characteristic(s).

In accordance with certain further embodiments of the present invention, a mobile station is provided. The mobile station includes at least one input device, a processor connected to the input device and configured to convert digital audio data into coded data bursts, a transmitter configured to transmit the coded data bursts in an uplink signal, and a position measuring data generator configured to generate position measuring data and selectively replace portions of the coded data bursts with at least portions of the position measuring data prior to transmission of the uplink signal by the transmitter. The position measuring data is configured to be quickly detectable within the uplink signal by a plurality of receiving nodes.

In accordance with still further embodiments of the present invention, a method for use in determining an approximate geographical location of a mobile station within a coverage area of a mobile telecommunications network is provided. This method includes the steps of generating an uplink signal with a mobile station, generating position measuring data in response to a mobile station location request, selectively replacing portions of the uplink signal with at least portions of the position measuring data, and transmitting the resulting uplink signal from the mobile station to a plurality of receiving nodes. The method further includes receiving the uplink signal at each of the receiving nodes and, in response, detecting the position measuring data within the received uplink signal and measuring at least one uplink signal characteristic associated with the receipt of the detected position measuring data, and determining an approximate geographical location of the mobile station based on the measured uplink signal characteristics from each of the receiving nodes.

The above stated needs and others are also met by a method for use in determining an approximate geographical location of a mobile station within a coverage area of a mobile telecommunications network, in accordance with certain additional embodiments of the present invention. This method includes the steps of initializing a call set up operation between a mobile station and a receiving node, and allocating a traffic channel for use by the mobile station. Following allocation of the traffic channel, but prior to completing an associated call connection, the method further introduces the steps of generating position measuring data within the mobile station and selectively uplink transmitting at least one data burst having position measuring data therein from the mobile station over the traffic channel to a plurality of receiving nodes having known geographical locations. The method further includes the step of, at each of the plurality of receiving nodes, measuring at least one uplink signal characteristic associated with receipt of the position measuring data. This is followed by the step of determining an approximate geographical location of the mobile station based on the measured uplink signal characteristics from each of the plurality of receiving nodes.

BRIEF DESCRIPTION OF THE DRAWINGS

A more complete understanding of the method and arrangements of the present invention may be had by reference to the following detailed description when taken in conjunction with the accompanying drawings wherein.

DETAILED DESCRIPTION OF THE DRAWINGS

Although the following description and accompanying drawings are based on an exemplary Global System for Mobile (GSM) communications system, it is intended that the various embodiments of the present invention are fully applicable and/or otherwise adaptable to other non-GSM mobile communication systems.

Figure 1:
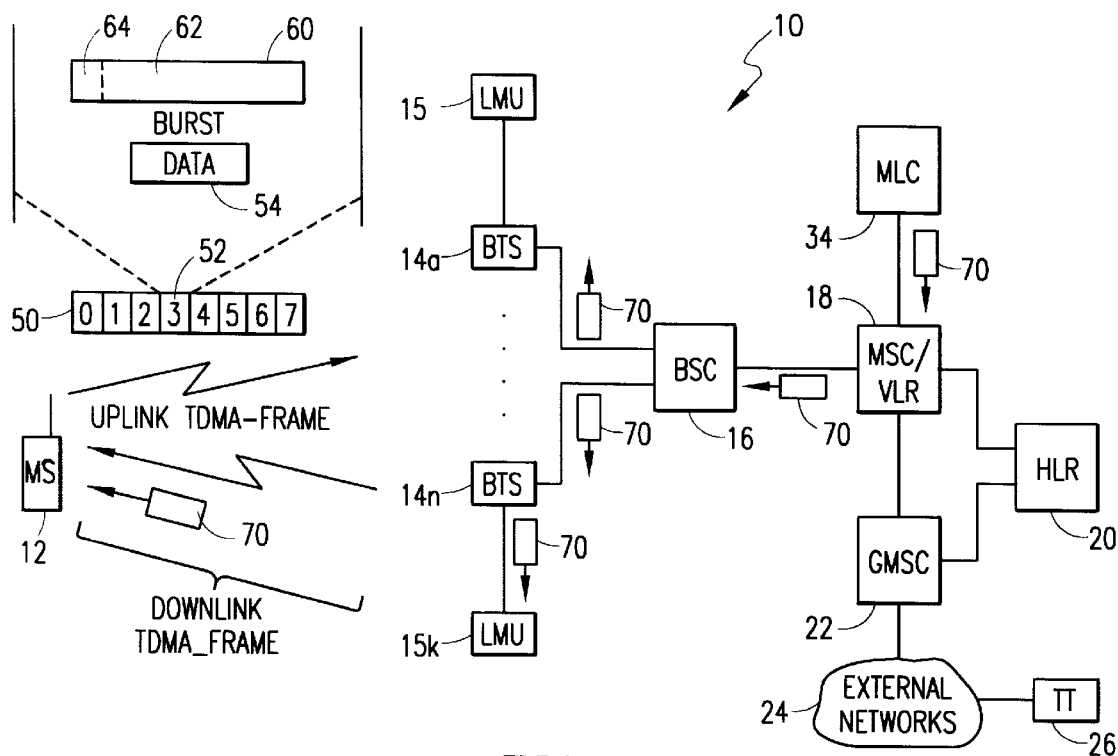
FIG. 1 is a block diagram depicting an exemplary mobile telecommunications network arranged to determine an approximate geographical location of a mobile station (MS) therein, based on at least one uplink signal characteristic associated with the receipt of position measuring data that is uplink transmitted from the mobile station to a plurality of location measurement unites (LMUs), in accordance with certain embodiments of the present invention.

With this in mind, FIG. 1 is a block diagram depicting an exemplary mobile telecommunications network 10 that is advantageously arranged to determine an approximate geographical location of a mobile station (MS) 12 located therein. The geographical location of MS 12 is determined by one or more resources within network 10 that are configured to measure uplink signal characteristics, such as, for example, a time of arrival (TOA), and angle of arrival (AOA), a signal strength, etc., using special position measuring data that is uplink transmitted from MS 12 and received by a plurality of location measurement units (LMUs) 15a–k located within radio range of MS 12.

MS 12 is a radio-based telecommunications device, such as, for example, a cellular telephone terminal, that can be moved about the coverage area of network 10 by a subscriber. MS 12 is configured to provide speech-based telecommunications when connected to the various resources/ services provided by network 10 and/or other external communication networks 24. MS 12 can further be configured(or alternatively configured) to provide non speech-based telecommunications, such as, for example, text Messaging, paging, etc.

Preferably, MS 12 is located within the coverage area of at least one of base transceiver stations (BTSs) 14a–n. BTSs 14a–n are each configured to communicate using radio signals with MS 12. In this manner, MS 12 is allowed to access or utilize the various telecommunications resources/ services provided by network 10 and/or external networks 24. An exemplary MS 12 is further depicted in FIG. 5 and discussed in greater detail further below.

As depicted in FIG. 1, each of the BTSs 14a–n is configured to send downlink transmitted data to MS 12 and receive uplink transmitted data from MS 12. BTSs 14a–n are further connected, typically through a wireline, to a base station controller (BSC) 16. In this manner, each of the BTSs 14a–n is able to relay communications data between MS 12 and BSC 16. Those skilled in the art will recognize that in certain situations (e.g., due to the current location of MS 12, and/or the network's configuration), one or more of the BTSs 14a–n may be connected to a different BSC (not shown). Similarly, a plurality of mobile switching centers (MSCs), as described below may also be provided in the network.

As shown in FIG. 1, a plurality of location measurement units (LMUs) 15a–k are also provided within network 10. Each LMU 15a–k is configured to detect position measuring data that is uplink transmitted by MS 12 at certain times during a call set up process and/or during a completed (i.e., existing)call connection. Each LMU 15a–k is configured to measure at least one uplink signal characteristic and to provide the results to BTS 14.

Figure 5:
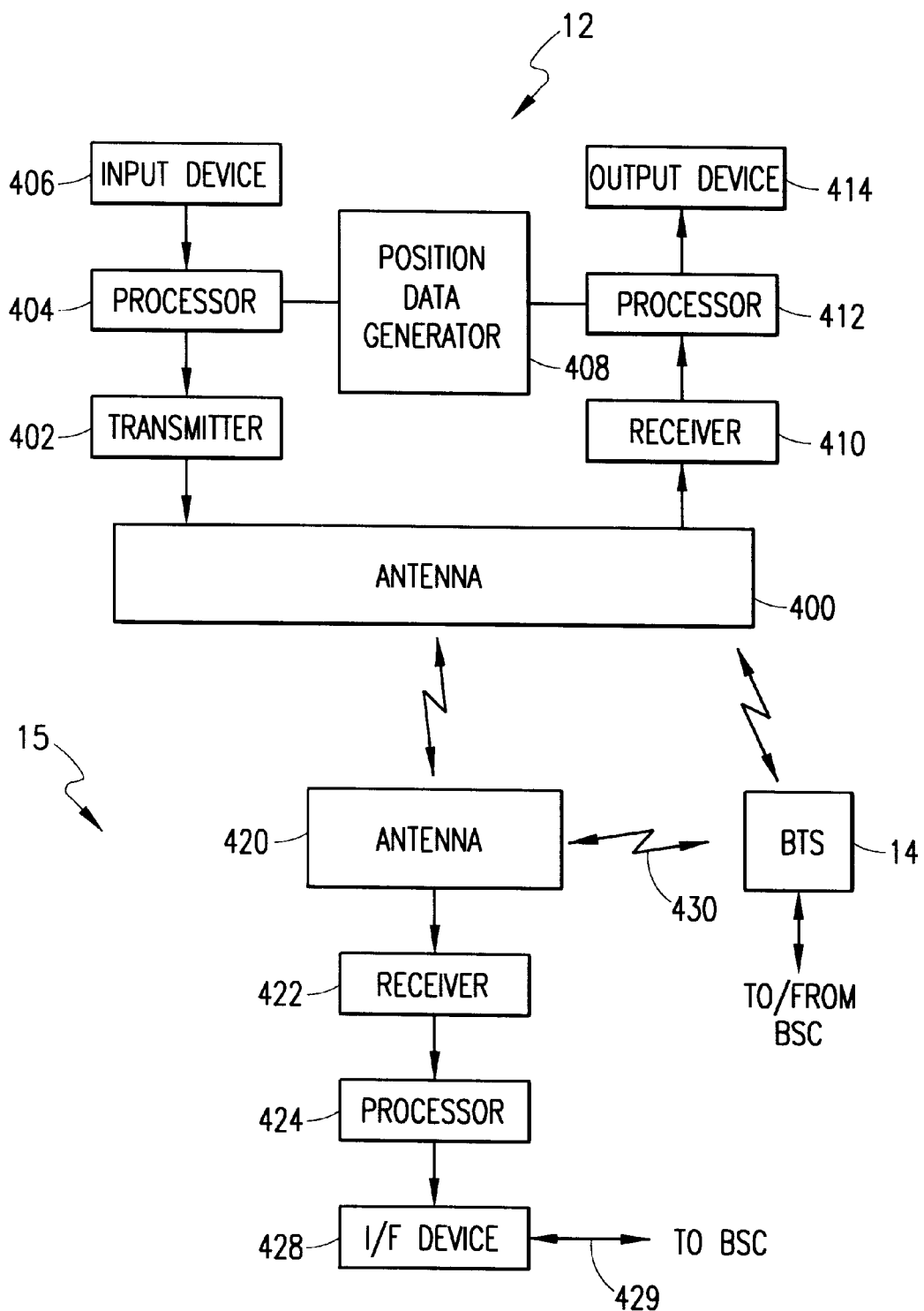
FIG. 5 is a block diagram depicting an exemplary mobile station (MS) having a position measuring data generator, a base transceiver station (BTS) and a location measurement unit (LMU), for example, as in FIG. 1, in accordance with still further embodiments of the present invention.

Each LMU 15 is configured to communicate with a respective BTS 14, for example, over a radio frequency link 430 (see FIG. 5). In this manner, LMU 15 is essentially configured as a separate mobile station, one difference being that LMU 15 communicates measured uplink signal characteristic data and related data to BTS 14. Also, in this manner, a positioning order 70 can also be relayed to LMU 15 via link 430.

BTS 14 is further configured to relay the uplink signal characteristics, via BSC 16, to a mobile location center (MLC) 34 or like function, for example, through a mobile services switching center/visitor location register (MSC/ VLR) 18. MLC 34 is configured to send various positioning orders 70 to LMUs 15a–k and MS 12 (i.e., through a BTS 14). LMUs 15a–k and MS 12 are each operatively responsive to certain positioning orders 70, which establish that an uplink signal characteristic measurement process (or mobile station locating process) is requested.

MSC/VLR 18 is essentially configured to complete/ manage calls to and from MS 12. As such, MSC/VLR 18 is connected to a home location register (HLR) 20 and a gateway mobile services switching center (GMSC) 22. Additionally, MSC/VLR 18 can be connected to a short message service (SMS) GMSC (not shown)or a like device, that is configured to provide additional communication services and/or an interface to such services.

The VLR portion of MSC/VLR 18 is typically a data base that is preferably co-sited with the MSC and is updated with information about the mobile stations being serviced by the MSC and its associated BSC 16/BTSs 14a–n. Thus, for example, assuming that MS 12 is activated, as the subscriber enters a cell or cells within the designated coverage area of MSC/VLR 18 the MS 12 is identified to the MSC through BSC 16/BTS 14. The MSC/VLR 18 then contacts HLR 20 to determine what services are to be provided to MS 12 and to update the data base of HLR 20 about the registration of MS 12 with MSC/VLR 18.

Once this registration process has been completed, MSC/ VLR 18 is configured to service MS 12. For example, MSC/VLR 18 can support a call set up operation for MS 12 originated calls (outgoing) and MS 12 terminated calls (incoming).

MLC 34 is configured to coordinate or otherwise provide mobile station location services. As such, MLC 34 is configured to respond to location requests from other resources, such as, for example, TT 26, GMSC 22, HLR 20, MSC/VLR 18, BSC 16, MS 12, etc. MLC 34 is configured to signal MS 12 and LMU 15a–k when a locating process is required.

MLC 34 is also configured to receive measured uplink signal characteristic(s) from the various LMUs 15a–k and to determine an approximate geographical location of MS 12 based thereon. Depending upon the type of measurements taken by LMUs 15a–k, one or more signal locating techniques can be employed within MLC 34 to determine an approximate geographic location for MS 12. Thus, by way of example, MLC 34 can implement a conventional trilateration process, triangulation process, arcuation process, and/or other like locating processes, to determine an approximate geographic location of MS 12.

Although depicted as separate from MSC/VLR 18, MLC 34 can be co-sited with MSC/VLR 18 or other resources within or without network 10. Similarly, at least one of LMUs 15a–k can be co-sited with a respective one of BTSs 14a–n.

GMSC 22 provides an interface to one or more external networks 24. External networks 24 can include, for example, public switched telephone networks (PSTN), integrated services digital networks, and/or other like voice or data networks. By way of further example, for an emergency call from MS 12, external networks 24 can provide access to at least one telecommunications terminal (TT) 26 connected to one of the external networks 24. TT 26, for example, can be configured as a public safety answering point (PSAP) terminal used to support emergency services. Thus, using MS 12, a subscriber can originate an emergency call connection to the PSAP terminal, TT 26, by dialing a predetermined number, such as, for example, 9-1-1 (in the United States). Likewise, an emergency call connection may further be established via a number of other methods, such as entering a service code or selecting a menu option. When the PSAP terminal receives this call, it would be helpful to determine the approximate geographical location of the calling party so that emergency services or other like services can be timely rendered or otherwise directed to the location of the calling party.

Previous uplink TOA methods, for example, as described in the Background section above, require that MS 12 attempt one or more handover operations, during which a plurality of access bursts are uplink transmitted by MS 12 and detected and associated TOA data is measured by receiving LMUs 15a–k. This method tends to cause interruptions to the user, whose mobile station is required to attempt unnecessary handover operations. Moreover, in a busy network, the number of unnecessary handover operations can become burdensome on the supporting network resources, and/or can quickly lead to interference and/or other transmission problems.

For these reasons and others, the present invention provides several different methods and arrangements that allow for special position measuring data sequences to be uplink transmitted by MS 12 to LMUs 15a–k (and BTSs 14a–n), during a call set up operation and/or during a completed call connection. The position measuring data is transmitted at specific times and in specific ways, such that the subscriber is substantially unaware that a mobile location process is even occurring.

Figure 2:
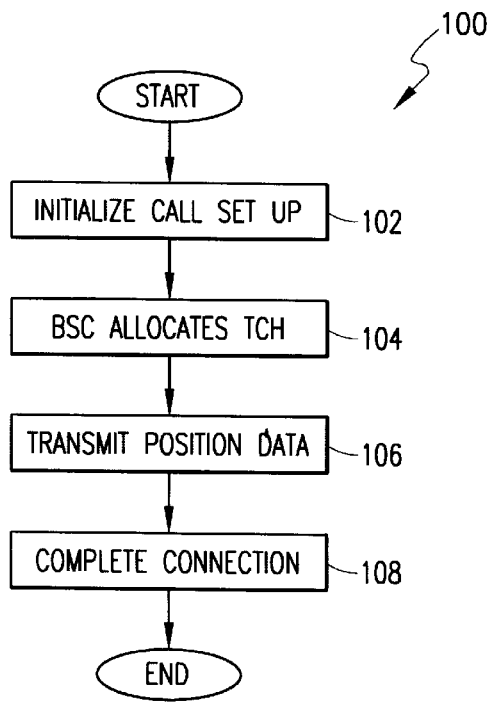
FIG. 2 is a flow chart depicting an exemplary method for use in a mobile telecommunications network, as in FIG. 1, wherein the mobile station (MS) is configured to transmit position measuring data to a plurality of location measurement units (LMUs) during a call set up operation, in accordance with certain embodiments of the present invention.

For example, the flow chart in FIG. 2 depicts an exemplary method 100, in accordance with certain embodiments of the present invention, that can be employed within network 10 to support the determination of an approximate geographical location of MS 12 without interrupting an ongoing call. In method 100, position measuring data is transmitted in one or more uplink transmissions from MS 12 to LMUs 15a–k during an initial call set up operation during which the subscriber is essentially waiting for an incoming or outgoing call to be connected. Preferably, the position measuring data is arranged to allow each of the LMUs 15a–k to measure at least one uplink signal characteristic (e.g., TOA, AOA, signal strength, etc.)for the received uplink signal. The resulting measured uplink signal characteristic data is then used to approximate the geographical location of MS 12, for example, using traditional trilateration, triangulation and/or arcuation locating methods.

As such, it is preferable that at least three different LMUs 15a–k provide measured uplink signal characteristic data associated with an uplink signal. Further, because MS 12 may be continually moving, the measured uplink signal characteristic data is preferably measured over a relatively short period of time.

Method 100, as depicted in FIG. 2, employs functions that take advantage of a relatively significant idle period of time during the call set up operation, in which little if any speech data is usually uplink/downlink transmitted. In particular, there is a period of time during a call set up operation wherein a traffic channel (TCH) has been allocated for use by MS 12, but the call connection has yet to be completed. Typically, this period of time lasts for at least about one second. During this second or so, in which the subscriber is essentially waiting for the connection to be completed, there is an opportunity for MS 12 to transmit position measuring data to LMUs 15a–k without significantly reducing the quality of service or otherwise interrupting the subscriber's service.

Method 100 includes step 102, wherein a call set up operation is initiated, for either an outgoing call or incoming call. Thus, for example, for an outgoing call, step 102 typically includes the steps of having MS 12 request a stand alone dedicated control channel (SDCCH) from BTS 14/BSC 16. Such a request is usually transmitted over a random access channel (RACH). Next, in response to this request, BSC 16 allocates an SDCCH to MS 12. BSC 16 usually downlink transmits this information to MS 12 over an access grant channel (AGCH). Then, MS 12 sends a call set up message to MSC/VLR 18 over the granted SDCCH. In response to the call set up message, if MSC/VLR 18 determines that the call is within the subscribed services for MS 12, then, MSC/VLR 16 directs BSC 16 to allocate a traffic channel (TCH) to MS 12.

Conversely, for an incoming call, step 102 typically includes the additional steps of having GMSC 22 receive calling information from external networks 24 (from TT 26, for example). In response, GMSC 22 queries or otherwise contacts HLR 20 about the current registration of MS 12 within network 10. HLR 20 determines the subscriber information associated with MS 12 and contacts the MSC/VLR 18 that is currently servicing MS 12. In response, the servicing MSC/VLR 18 provides a roaming number to GMSC 22. This roaming number is used by GMSC 22 to reroute the incoming call to MSC/VLR 18. MSC/VLR 18, having received the rerouted call, then sends a paging message to MS 12 over a paging channel (PCH) via BSC 16/BTS 14. The paging message leads MS 12 to request an SDCCH and eventually send a call set up message to MSC/VLR 18, which directs BSC 16 to allocate a TCH to MS 12.

Next, for either an outgoing or incoming call, per step 104, BSC 16 allocates a free TCH to MS 12 and identifies the allocated TCH to BTS 14, MS 12 and LMUs 15a–k.

In a typical mobile telecommunications network, step 108 would follow step 104. In step 108, the call connection is completed between MS 12 and another terminal/station, such as, for example, TT 26 or another MS (not shown). There is, however, an inherent and relatively significant period of time between step 104 (i.e., the allocation of TCH) and step 108 (i.e., the completed call connection), during which alert signaling or a ringing tone occur.

In accordance with certain embodiments of the present invention, an additional step 106 is introduced between steps 104 and 108. In step 106, MS 12 transmits position measuring data over the newly allocated and relatively idle TCH. For example, position measuring data is uplink transmitted within a burst 54 (or 60) of data transmitted during a time slot 52 of a time division multiple access (TDMA) frame 50 (see FIG. 1).

In this manner, method 100 provides a fairly non-obtrusive method for transmitting position measuring data from MS 12 to a sufficient number of LMUs 15a–k, to allow for an uplink signal characteristic measurement. Since it usually takes at least about one second for the call connection to be completed following allocation of the TCH, there will be very little noticeable interruption to the subscriber as a result of step 106. Moreover, the period of time associated with step 106 can be increased or decreased in length as needed to provide a desired call set up delay time. Further, several uplink signal characteristic measurements can be taken during this period of time to increase the reliability of the measured uplink signal characteristic data, for example, allowing for additional processing to remove noise contributions in the received uplink signal.

There is, however, a potential for interruption in non-speech services/functions in certain networks. For example, interruptions may occur in networks having alert signaling associated with an SMS capability. The SMS capability would normally be able to utilize the period of time between steps 104 and 108. However, such alert signaling could be accomplished at a later time and/or over another channel.

For outgoing calls there may be a delay as a result of step 106. For example, if the transmission of positioning data takes longer than it takes for the called party to answer, then the call may be delayed briefly, until such time as the positioning data has been transmitted. Such a delay, would only last about a second or so, and should be acceptable to most subscribers.

As such, it appears that the benefits to transmitting position measuring data during this somewhat idle period of time, or a like period of time in another signaling process, clearly outweigh these minor and fairly imperceivable interruptions.

Figure 3:
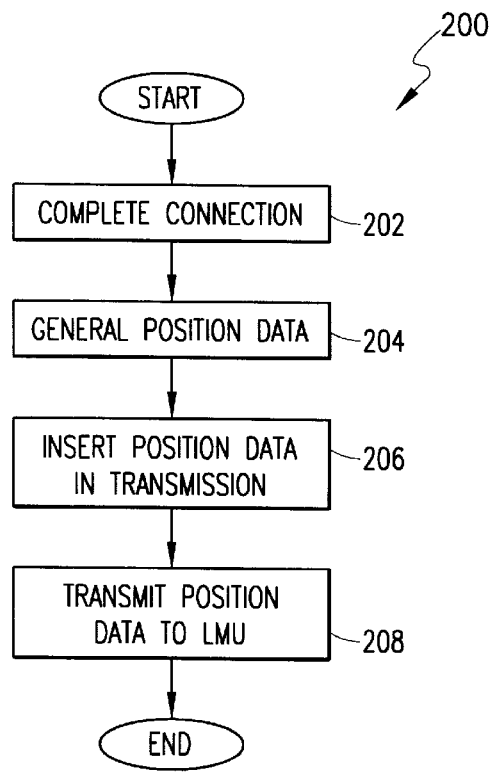
FIG. 3 is a flow chart depicting an exemplary method for use in a mobile telecommunications network, as in FIG. 1, wherein the mobile station (MS) is configured to transmit position measuring data to a plurality of location measurement units (LMUs) during a call connection by inserting the position measuring data within a stream of conventional data transmissions, in accordance with certain further embodiments of the present invention.

Reference is now made to the flow chart of FIG. 3, which depicts a method 200 for the uplink transmitting of position measuring data, in accordance with yet other embodiments of the present invention.

In method 200, position measuring data is strategically inserted by MS 12 into a channel, such as, for example, the TCH following the completion of a call connection, as in step 202. Alternatively, position measuring data can be strategically inserted into a non-traffic channel, such as, for example, a command channel.

Method 200 provides a further enhancement to method 100, and/or a separate method for transmitting position measuring data from MS 12 to LMUs 15a–k.

In step 202, the call connection between MS 12 and a BTS 14 associated with a logical channel is completed. Next, in step 204, position measuring data is generated or otherwise provided by MS 12. In step 206, the position measuring data from step 204 is inserted into the transmission sequence associated with the channel. Step 206 can include, for example, selectively replacing portions of the uplink signal with at least portions of the position measuring data by dynamically controlling the timing of the position measuring data within the uplink signal over a period of time. Step 206 can also include, for example, temporarily delaying the timing of the position measuring data within said uplink signal when the uplink signal includes critical command signaling data. This feature essentially allows the uplink signal characteristic measurement process to be selectively preempted by more important signaling processes.

In accordance with certain embodiments of the present invention, portions of the position measuring data strategically replace portions of at least one burst 54 of data (see FIG. 1) in the TDMA frame associated with the channel. This "data stealing" technique allows the position measuring data to be uplink transmitted by MS 12 and detected by LMU 15a–k at selected times during a period of time. Preferably, the amount of data stealing is kept low to avoid significantly degrading the quality of service provided to the subscriber. In accordance with still further embodiments of the present invention, in step 206 at least a portion 62 (e.g., see FIG. 1) of the position measuring data generated in step 204 is included within a positioning burst 60. Positioning burst 60 is configured to be inserted into time slot 52 of uplink TDMA frame 50, for example, replacing burst 54. This "burst stealing" technique also allows the position measuring data to be uplink transmitted by MS 12 and detected by LMU 15a–k at selected times during a period of time. As with the data stealing technique, the amount of burst stealing is also preferably moderated at a low enough level to avoid significantly degrading the quality of service provided to the subscriber.

Next, in step 208, MS 12 uplink transmits the position measuring data to LMU 15a–k using a modified burst of data when the data stealing technique is implemented, or a positioning burst when the burst stealing technique is implemented.

Figure 4:
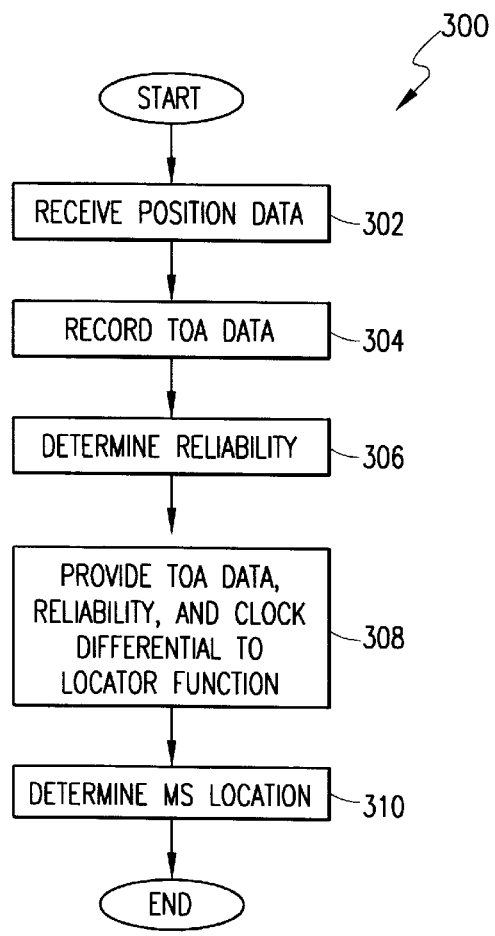
FIG. 4 is a flow chart depicting an exemplary method for use in a mobile telecommunications network, as in FIG. 1, wherein an approximate geographical location of a mobile station (MS) is determined using position measuring data uplink transmitted by the mobile station, for example as in the methods of FIGS. 2 and/or 3, in accordance with certain embodiments of the present invention.

FIG. 4 is a flow chart depicting an exemplary process 300 for use in network 10, as in FIG. 1, wherein an approximate geographical location of MS 12 is determined using position measuring data uplink transmitted by MS 12, for example, as in processes 100 or 200, in accordance with certain embodiments of the present invention. In step 302, the position measuring data is received by LMU 15a–k. Uplink signal characteristic measurement data is determined by LMU 15a–k and recorded therein, in step 304. Next, in step 306, LMU 15a–k determines the reliability of the measured TOA data, in step 306, for example, using conventional statistical reliability measuring techniques. In step 308, LMU 15a–k uses network 10 resources or other communication arrangements to provide at least a portion of the measured uplink characteristic data and associated reliability data to MLC 34. If network 10 is not fully synchronized, then additional clock or timing differential data can be provided by LMU 15a–k to MLC 34 as part of step 308, when applicable (e.g., for TOA measured data).

In step 310, MLC 34 determines the approximate geographic location of MS 12 based on the measured uplink signal characteristic data from a plurality of LMUs 15a–k, for example, using conventional trilateration, triangulation, arcuation, and other like locating techniques. The approximate geographic location of MS 12 can then be supplied, as part of step 310, to other resources within or without network 10.

Regardless of the stealing (or replacement) technique implemented, it is important that enough position measuring data be transmitted by MS 12 to allow the receiving LMUs 15*a*–*k* to reasonably measure the uplink signal characteristic data.

By way of example, if uplink TOA data is measured and a burst stealing technique is implemented, in order to process the same amount of data as in a traditional uplink TOA technique (e.g., attempted handover procedure), about twenty positioning bursts 60 will need to be transmitted by MS 12. To maintain an acceptable quality of service, positioning bursts 60 are preferably interleaved within the channel (i.e., within the stream of normal bursts of data) over a period of time suitable to allow for reasonably reliable uplink TOA data measurements to be taken. The duration of this "measurement period" depends, at least in part, on the mobility associated with MS 12 (i.e., how fast MS 12 can move geographically). Preferably, the measurement period will be significantly short enough to allow for reliable and fairly accurate geographical location determinations. By way of example, the vast majority of mobile stations will not move more than about 50 meters per second. For these mobile stations, the geographical location determined after a one second measurement period should satisfy most mandated location requirements. Since about two hundred bursts of data can be uplink transmitted each second, about 10% (i.e., one out of ten) of these bursts will need to be stolen and replaced by positioning bursts 60 in order to provide twenty positioning bursts per second. This assumes that each positioning burst 60 includes about 150 bits of position measuring data, a portion of which can also include formatting data 64 (e.g., tail bits, training bits, identification bits, and the like). Of course, for different arrangements, positioning burst 60 can include more than 150 bits or less than 150 bits of position measuring data. Those skilled in the art will recognize that similar considerations and analysis can be applied to data stealing techniques and/or other uplink signal characteristic data measurements.

One important issue is determining how much data to steal and replace with position measuring data within an existing burst 54. For example, in a TCH that uses normal bursts of data, the burst typically includes two sequences of speech data (usually encrypted) and additional formatting and/or training data sequences. In accordance with one embodiment of the present invention, only the speech data is stolen, thereby leaving the formatting/training data undisturbed. For example, in a typical burst 54 on the TCH, the two 57-bit sequences of speech data can be stolen and replaced with two 57-bit sequences of position measuring data, while the training, tail and/or other flag bits are not disturbed. When a BTS 14 receives this modified burst of data it will, for example, determine that the received (assumed) speech data is good, because of the training bits, for example. Unfortunately, this false determination may lead BTS 14, and particularly, a speech decoder therein, to be confused by the position measuring data. Nevertheless, when LMUs 15*a*–*k* examine the received burst, the position measuring data therein will be correctly identified.

For burst stealing techniques, the entire burst, including the training sequence is stolen and replaced with new data. Thus, for example, the training data can be replaced with random data that causes BTS 14 to recognize that the assumed speech data is not good. As described below, this tends to reduce the frame erasure rate (FER) associated with BTS 14. Therefore, the burst stealing techniques may prove to be more advantageous for certain systems.

Those skilled in the art will further recognize that the results from several measurement periods can be processed and/or otherwise combined, for example, using LMUs 15*a*–*k*/MLC 34, to increase the accuracy of the location process. Thus, the approximate movement (e.g., direction, speed, vector, doppler, etc.) of MS 12, over time can be determined.

Experimental modeling of an exemplary network 10, for different thermal noise levels (Eb/N0), was conducted to determine an expected FER for different data stealing and burst stealing techniques. To provide an acceptable speech quality, the FER is typically kept low, for example, less than about 5%, and more preferably less than about 1%. For limited durations, however, it is expected that an FER of between about 5% to about 10% would be also acceptable to most subscribers.

Figure 6:
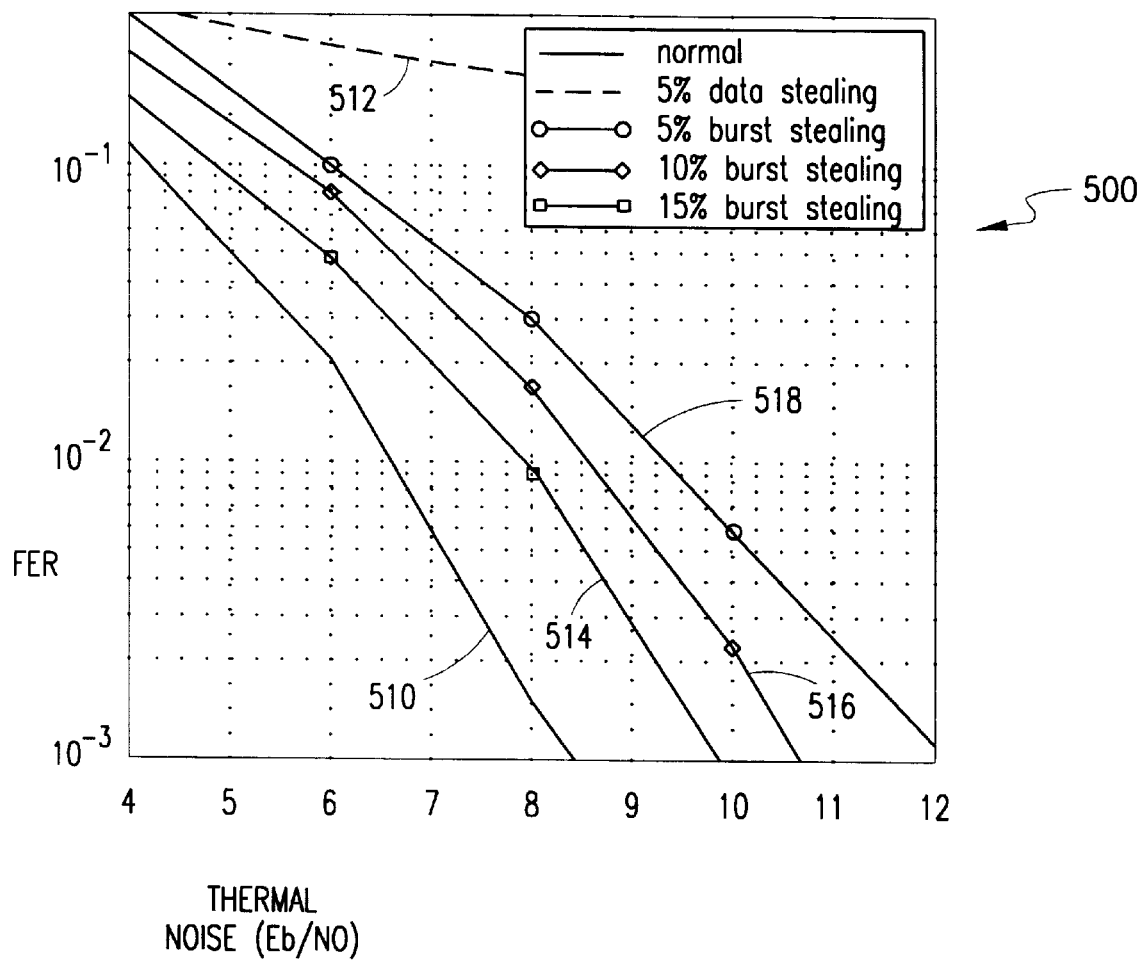
FIG. 6 is a graph depicting the expected Frame Erasure Rate (FER) within a network, as in FIG. 1, as a result of implementing certain data stealing and burst stealing techniques in accordance with certain exemplary embodiments of the present invention.

For the purposes of comparison, FIG. 6 is a semi-logarithmic graph 500 depicting the expected FER for different uplink signals versus different thermal noise level. Line 510 depicts the results for a normal uplink transmission of bursts 54 without data stealing nor burst stealing occurring. Line 512 depicts the results for an uplink transmission having about 5% of the bursts modified by a data stealing technique. Line 514 depicts the results of an uplink transmission having about 5% of the bursts stolen by a burst stealing technique. Similarly, lines 516 and 518 depict the results of uplink transmissions having about 10% and 15%, respectively, of the bursts stolen by a burst stealing technique.

In a noise limited environment, a 10% burst stealing corresponds to a sensitivity loss of around 2 dB during a one second period, assuming the BTS is unaware of the burst stealing. Thus, it appears that most subscribers would not even notice the presence of a mobile positioning process, whereas some subscribers might experience a slight quality degradation. For example, it appears that subscribers within an environment with Eb/N0 above 10 dB will not notice the operation, while those subscribers within an environment with Eb/N0 below 10 dB may experience a slight degradation. There will not, however, be one-third second interruptions as in previous systems.

In accordance with still further embodiments of the present invention, several types of position measuring data sequences are employed, depending upon the network 10. Preferably, the position measuring data is optimized for the environment/network and predefined or otherwise determinable. For example, let us assume that the system has a predefined number, I, of positioning bursts $\{x_i\}$, where, i=1 . . . I. In MS 12, the position measuring data is either prestored and/or otherwise generated when needed (e.g., using position measuring data generator 408 as shown in FIG. 5). By way of further example, in certain preferred embodiments of the present invention, the position measuring data includes a Gold code, or a like code from another family of perfect sequences, such that the uplink transmitted positioning bursts (or modified bursts in a data stealing arrangement) are each substantially "different".

It is also preferred that the order in which the positioning bursts (or modified bursts) are uplink transmitted by MS 12 be carefully controlled to further differentiate the bursts and potentially provide information about the ongoing positioning operation. For example, MS 12 can be provided with a sequence of burst numbers $i_k$, where k=1 . . . K and $1 \leq i_k \leq I$. The sequence $\{i_k\}$ is preferably itself a carefully designed sequence, such as, for example, a pn-sequence or like sequence that can be easily generated by a few parameters. Upon the reception of a positioning order 70, for example, MS 12 transmits the bursts defined by the sequence $\{i_k\}$. Those skilled in the art will recognize that positioning orders 70 can also relay information on the desired power level for the positioning burst transmission.

Thus, by designating the bursts and the transmission order in this manner, the positioning bursts and/or modified bursts can be optimized for use in uplink signal characteristic measurements, because the position measuring data therein will be essentially uncorrelated to the other data in the system which significantly reduces the potential for false detections in the BTSs 14a–n. Furthermore, by making the various burst transmissions different from mobile station to mobile station, and cell to cell, the potential for signal interference is significantly reduced.

With this in mind, FIG. 5 is a block diagram depicting an exemplary MS 12, BTS 14 and LMU 15, in accordance with certain further embodiments of the present invention. MS 12 includes an antenna 400, a transmitter 402, a transmitting processor 404, at least one input device 406, a position measuring data generator 408, a receiver 410, a receiving processor 412, and at least one output device 414.

Referring to the transmitting elements of MS 12, input device 406 includes a microphone that is configured to detect the subscriber's speech and output a corresponding digital voice signal to processor 404. Input device 406 can also include a keypad or other user interface mechanism for entering information. Transmitting processor 404 is configured to receive the digital voice signal from input device 406 and output bursts of data to transmitter 402. Within transmitting processor 404, for example, the digital voice signal is segmented, and coded for a particular channel. Then, the segmented and coded data is interleaved, ciphered, and formatted into a burst of data suitable for transmission.

Position measuring data generator 408 is connected to transmitting processor 404 and configured to selectively provide or otherwise cause transmitting processor 404 to include position measuring data within the burst of data. Position measuring data generator 408 can be implemented in hardware and/or software, and include, for example, stored data sequences, algorithms, or other data generating mechanisms. Transmitter 402 is connected between transmitting processor 404 and antenna 400, and configured to amplify, modulate and transmit bursts of data over one or more radio frequencies using antenna 400.

Referring to the receiving elements of MS 12, antenna 400 is connected to receiver 410, which is configured to receive a radio signal from antenna 400. Receiver 410 amplifies and demodulates the received signal and outputs a corresponding received burst of data to receiving processor 412. Receiving processor 412 is connected to receiver 410 and processes the received burst of data, for example, using one or more equalizers, de-cipherers, de-interleavers, and/or decoders.

Receiving processor 412 is connected to position measuring data generator 408 and configured to identify when a mobile station location process is to occur, for example, based on a received command signal or a positioning order 70 from network 10 resources (e.g., MLC 34). Receiving processor 412 is further connected to output device 414, which is configured to output received digital data to the subscriber. For example, if the received digital data includes speech data, then output device 414 includes a digital to analog (D/A) convertor and an audio speaker. Output device 414 can also include other output mechanisms, such as, for example, a visual display/indicator suitable for providing non-speech data to the subscriber.

A BTS 14 is depicted as being in radio signal contact with MS 12. BTS 14 is configured to relay information in the form of data bursts between MS 12 and BSC 16.

LMU 15, in accordance with certain exemplary embodiments of the present invention, includes an antenna 420, a receiver 422, a receiving processor 424, an interface (I/F) device 428.

Antenna 420 is connected to receiver 422, which is configured to receive a radio signal from antenna 420. Preferably, antenna 420 has a larger radio-range than would a traditional BTS. Receiver 422 amplifies and demodulates the received signal and outputs a corresponding received burst of data to receiving processor 424. Receiving processor 424 is connected to receiver 422 and processes the received burst of data, for example, using one or more equalizers, de-cipherers, de-interleavers, and/or decoders. Receiving processor 424 is configured to identify position measuring data within the received burst of data, measure and collect uplink signal characteristic data, and to provide this data to I/F device 428 and eventually to MLC 34. The measured uplink characteristic data can include TOA data, AOA data, signal strength data, etc. and in certain embodiments also includes other identifying data (e.g., LMU id, MS id, etc.), LMU time-offsets (e.g., from a reference time, GPS time, etc.), reliability measurements, position measuring data, and the like. I/F device 428, which is configured to output, over connection 429, the processed digital data and other data from LMU 15a–k to BSC 16 and/or other resources within network 10.

MS 12, BTS 14 and LMU 15, as depicted in FIG. 5 are intended as examples only. Those skilled in the art will recognize that two or more of the functions/blocks depicted in FIG. 5 can be combined or otherwise modified to increase efficiency and/or decrease costs. For example, LMU 15a–k can be co-sited with BTS 14.

Figure 7:
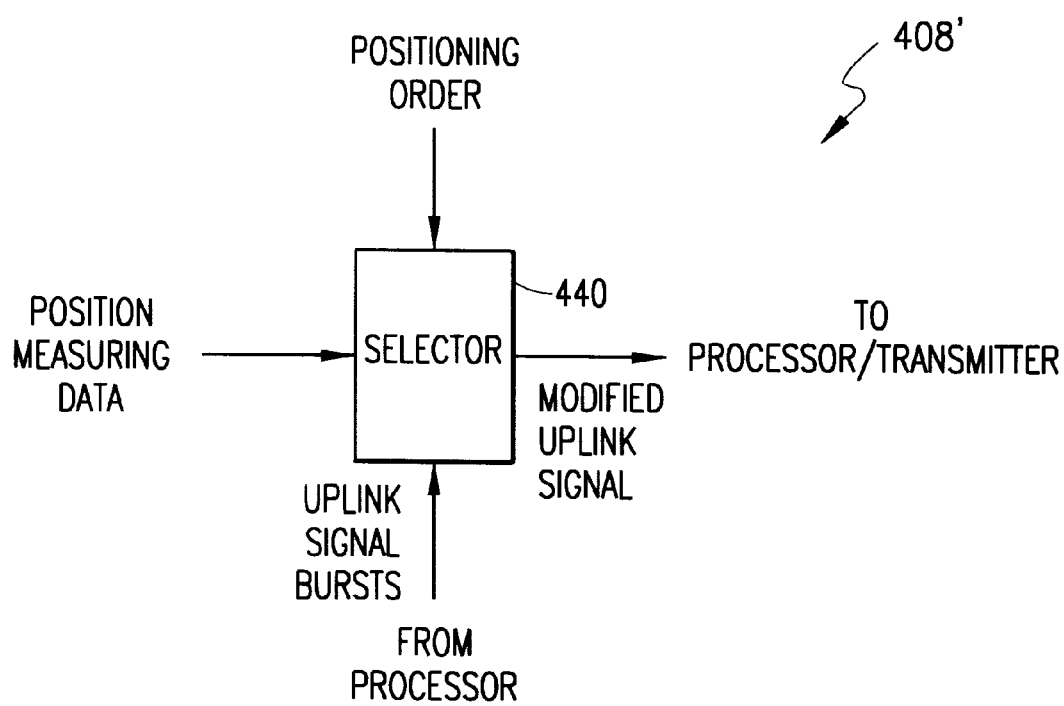
FIG. 7 is a block diagram depicting positioning data generator, as in FIG. 5, in accordance with certain further embodiments of the present invention.

FIG. 7 is a block diagram depicting an exemplary position data generator 408' that can be employed in MS 12 of FIG. 5, in accordance with certain embodiments of the present invention. Position data generator 408' includes a selector 440 that is configured to receive a positioning order 70, and in response to modify one or more uplink signal bursts from processor 404 by inserting position measuring data therein. The output of selector 440 is a modified uplink signal that can be returned to processor 404 and/or transmitter 402. In this manner, for example, selective data and/or burst stealing can be accomplished. Selector 440 can be implemented in either hardware and/or software.

Using the methods and arrangements as described in the exemplary embodiments of FIGS. 1–7, an approximate geographical location of a mobile station can be determined without having to unnecessarily burden the network resources and/or otherwise significantly interrupt the service provided to the subscriber, while still providing added measurement time, which permits improvements over conventional uplink signal characteristic measurements.

In accordance with still further embodiments of the present invention, position measuring data can be transmitted during or following a handover operation. For example, when MS 12 receives a handover request before the transmission of the position measuring data has been completed, MS 12 continues to transmit the position measuring data over the previously used channel, until completed or the network releases it.

This continued transmission scheme can be, for example, controlled by setting a flag or otherwise providing a like indicator to MS 12 and LMUs 15a–k as part of the handover process, or through positioning orders 70. This flag or indicator instructs MS 12 to: 1) "continue" transmitting positioning data over the previously used channel even though the call has moved to a new channel; 2) "stop" the transmission of positioning data and perform the handover as ordered; or 3) "wait", in which case, MS 12 postpones the handover until such time as the transmission of the positioning data is completed.

As described above, the various methods and arrangements of the present invention enhance the performance of the mobile location process, avoid significant speech interruptions, can be configured to reduce the probability of confusing a BTS, and/or reduce the possible bad effects of transmitting the same sequence of data seventy or more times, without requiring significant modifications to the network resources.

The various methods and arrangements are further improved when MLC 34 is configured to specify or otherwise control (e.g., through one or more positioning orders 70) the type of positioning data generated by MS 12, and/or the timeslots/bursts that are to be either modified (e.g., data stealing) or replaced entirely (e.g., burst stealing).

Although some preferred embodiments of the methods and arrangements of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. An arrangement for use in determining an approximate geographical location of a mobile station (MS) within a coverage area of a mobile telecommunications network based on a plurality of uplink signal characteristic measurements for uplink signals transmitted by the MS, the arrangement comprising:

a mobile station (MS) configured to generate and transmit an uplink signal having a plurality of data bursts;

a data generator, within said MS, said data generator being configured to selectively steal at least a portion of said uplink signal by generating position measuring data and replacing portions of said uplink signal with at least portions of said position measuring data prior to transmission of said uplink signal by said MS;

a plurality of receiving nodes having known geographical locations within the coverage area of the mobile telecommunications network, each of said receiving nodes being configured to receive said uplink signal, detect said position measuring data and measure at least one uplink signal characteristic associated with the receipt of said position measuring data;

a mobile location center (MLC) operatively configured to receive measured uplink signal characteristic data associated with each of said receiving nodes, said MLC being further configured to determine an approximate geographical location of said MS based on said measured uplink signal characteristic data.

2. The arrangement as recited in claim 1, wherein said data generator is configured to selectively steal data bursts by replacing at least one of said data bursts with a positioning burst that includes at least a portion of said position measuring data, and wherein said MS transmits said positioning burst in said uplink signal.

3. The arrangement as recited in claim 1, wherein said MLC is further configured to control said position data generator and said receiving nodes through at least one positioning order communicated thereto.

4. The arrangement as recited in claim 3, wherein said positioning order defines at least one timeslot in said uplink signal in which said position measuring data is to be transmitted.

5. The arrangement as recited in claim 3, wherein said positioning order identifies said position measuring data that is to be transmitted.

6. The arrangement as recited in claim 1, wherein said uplink signal includes training data that is further replaced by at least a portion of said position measuring data.

7. The arrangement as recited in claim 1, wherein at least a portion of said plurality of data bursts further include speech data, and said data generator is configured to selectively steal data by replacing at least a portion of said speech data with at least a portion of said position measuring data.

8. The arrangement as recited in claim 1, wherein said position measuring data comprises a substantially random sequence of data, said sequence of data being predetermined.

9. The arrangement as recited in claim 1, wherein said data generator is further configured to dynamically control the timing of said position measuring data within said uplink signal over a period of time.

10. The arrangement as recited in claim 9, wherein said data generator is further configured to temporarily delay the timing of said position measuring data within said uplink signal when said uplink signal includes command signaling data.

11. The arrangement as recited in claim 1, wherein said MLC is further configured to operatively control said data generator and said receiving nodes as part of a mobile station location process during which said MLC determines said approximate geographical location of said MS.

12. The arrangement as recited in claim 1, wherein said MS is further configured to continue transmitting said uplink signal, having said position measuring data therein, over a first channel for a finite period of time following a successful handover operation in which said MS is redirected to continue transmitting said uplink signal over a second channel.

13. The arrangement as recited in claim 12, wherein said MS is further configured to continue transmitting said uplink signal, having said position measuring data therein, following a successful handover operation in response to a priority indicator provided to said MS by said MLC.

14. The arrangement as recited in claim 1, wherein said data generator is responsive to a positioning order from said MLC, said positioning order including information indicative of a burst content selected from a set of possible burst contents.

15. The arrangement as recited in claim 1, wherein said at least one uplink signal characteristic is selected from a group of uplink signal characteristics comprising, time of arrival (TOA), angle of arrival (AOA), and signal strength.

16. A mobile station (MS) suitable for use within a mobile telecommunications network, said MS comprising:

a processor configured to convert desired information into a plurality of coded data bursts;

a transmitter connected to said processor and configured to transmit said coded data bursts in an uplink signal;

a data generator connected to said processor and configured to selectively steal at least a portion of said uplink signal by generating position measuring data and replacing portions of said coded data bursts with at least portions of said position measuring data prior to transmission of said uplink signal by said transmitter, said position measuring data being configured to be detectable within said uplink signal by a plurality of receiving nodes.

17. The MS as recited in claim 16, wherein said data generator is configured to selectively steal data bursts by replacing at least one of said coded data bursts with a positioning burst that includes at least a portion of said position measuring data and said transmitter transmits said positioning burst in said uplink signal.

18. The MS as recited in claim 16, wherein said data generator outputs a substantially random sequence of data.

19. The MS as recited in claim 16, wherein said data generator is further configured to dynamically control the timing of said position measuring data within said uplink signal over a period of time.

20. The MS as recited in claim 19, wherein said data generator is further configured to temporarily delay the timing of said position measuring data within said uplink signal when said uplink signal includes command signaling data.

21. The MS as recited in claim 16, wherein said transmitter is further configured to continue transmitting said uplink signal, having said position measuring data therein, over a first channel for a finite period of time following a successful handover operation in which said MS is redirected to continue transmitting said uplink signal over a second channel.

22. A method for use in determining an approximate geographical location of a mobile station (MS) within a coverage area of a mobile telecommunications network, the method comprising the steps of:

generating an uplink signal, having a plurality of data bursts, with a mobile station (MS);

generating position measuring data, with said MS in response to a mobile station location request;

selectively stealing at least a portion of said uplink signal by replacing at least portions of said plurality of data bursts with portions of said position measuring data;

transmitting said uplink signal, including said inserted positioning data, from said MS to a plurality of receiving nodes having known geographical locations within the coverage area of the mobile telecommunications network;

receiving said uplink signal, including said positioning data, at each of said receiving nodes and, in response, detecting said position measuring data within said received uplink signal and measuring at least one uplink signal characteristic associated with the receipt time of said detected position measuring data; and determining an approximate geographical location of said MS based on measured uplink signal characteristic data from each of said receiving nodes.

23. The method as recited in claim 22, wherein said at least one uplink signal characteristic is selected from a group of uplink signal characteristics comprising time of arrival (TOA), angle of arrival (AOA), and signal strength.

24. The method as recited in claim 22, wherein said step of replacing portions of said uplink signal with at least portions of said position measuring data further includes:

selectively stealing data bursts by replacing at least one of said data bursts with a positioning burst that includes at least a portion of said position measuring data.

25. The method as recited in claim 22, wherein at least a portion of said plurality of data bursts further include speech data, and said step of replacing portions of said uplink signal with at least portions of said position measuring data further includes:

selectively stealing data within at least one of said data bursts by replacing at least a portion of said speech data with at least a portion of said position measuring data.

26. The method as recited in claim 22, wherein said step of generating position measuring data further includes generating a substantially random sequence of data.

27. The method as recited in claim 22, wherein said step of replacing portions of said uplink signal with at least portions of said position measuring data further includes:

dynamically controlling the timing of said position measuring data within said uplink signal over a period of time.

28. The method as recited in claim 27, wherein said step of replacing portions of said uplink signal with at least portions of said position measuring data further includes:

temporarily delaying the timing of said position measuring data within said uplink signal when said uplink signal includes command signaling data.

29. The method as recited in claim 22, further comprising the step of:

transmitting said uplink signal, having said position measuring data therein, over a first channel for a finite period of time following a successful handover operation in which said MS is redirected to continue transmitting said uplink signal over a second channel.

30. A method for use in a mobile station (MS) that is configurable for use within a mobile telecommunications network, the method comprising the steps of:

converting desired information into a plurality of coded data bursts;

generating position measuring data; and selectively replacing portions of said plurality of coded data bursts with at least portions of said position measuring data prior to transmission of said uplink signal, said position measuring data being configured to be detectable within said uplink signal by a plurality of receiving nodes.

31. The method as recited in claim 30, wherein said step of selectively replacing portions of said plurality of coded data bursts with at least portions of said position measuring data prior to transmission of said uplink signal further includes:

selectively replacing at least one of said data bursts with a positioning burst that includes at least a portion of said position measuring data.

32. The method as recited in claim 30, wherein said position measuring data includes a substantially random sequence of data.

33. The method as recited in claim 30, wherein said step of selectively replacing portions of said plurality of coded data bursts with at least portions of said position measuring data prior to transmission of said uplink signal further includes:

dynamically controlling the timing of said position measuring data within said uplink signal over a period of time.

34. The method as recited in claim 30, wherein said step of selectively replacing portions of said plurality of coded data bursts with at least portions of said position measuring data prior to transmission of said uplink signal further includes:

temporarily delaying the timing of said position measuring data within said uplink signal when said uplink signal includes command signaling data.

35. The method as recited in claim 30, further comprising the step of:

transmitting said uplink signal, having said position measuring data therein, over a first channel for a finite period of time following a successful handover operation in which said MS is redirected to continue transmitting said uplink signal over a second channel.

36. A method for use in determining an approximate geographical location of a mobile station (MS) within a coverage area of a mobile telecommunications network, the method comprising the steps of:

initializing a call set up operation between a mobile station (MS) and a receiving node;

allocating a traffic channel for use by said MS;

following allocation of said traffic channel, but prior to completing an associated call connection, generating position measuring data within said MS and selectively uplink transmitting at least one data burst having position measuring data therein, from said MS over said traffic channel to a plurality of receiving nodes having known geographical locations;

at each of said plurality of receiving nodes, measuring at least one uplink signal characteristic associated with receipt of said position measuring data; and determining an approximate geographical location of said MS based on measured uplink signal characteristic data from each of said plurality of receiving nodes.

37. The method as recited in claim 36, wherein said at least one uplink signal characteristic is selected from a group of uplink signal characteristics comprising, time of arrival (TOA), angle of arrival (AOA), and signal strength.

38. The method as recited in claim 36, wherein a set of data bursts having position measuring data therein are sequentially uplink transmitted by said MS following allocation of said traffic channel, but prior to completing said call connection.

39. The method as recited in claim 38, wherein said set of data bursts having position measuring data therein are sequentially uplink transmitted by said MS for a predetermined period of time following allocation of said traffic channel, after which said call connection is completed.

40. The method as recited in claim 39, wherein said predetermined period of time is at least about one second in length.

41. The method as recited in claim 36, wherein said step of generating position measuring data further includes generating a substantially random sequence of data.

\* \* \* \* \*

UNITED STATES PATENT AND TRADEMARK OFFICE
CERTIFICATE OF CORRECTION

PATENT NO. : 6,295,455 B1
DATED : September 25, 2001
INVENTOR(S) : Fischer et al.

It is certified that error appears in the above-identified patent and that said Letters Patent is hereby corrected as shown below:

<u>Title page,</u>
Item [75], Inventors, replace "Nërnberg" with -- Nürnberg --
Item [56], References Cited, add U.S. PATENT DOCUMENTS,
-- 5,596,333    A    1/1997    Bruckert . . . . . . . . . . . . . . . . . . 342/457 --
-- 5,903,844    A    5/1999    Bruckert et al. . . . . . . . . . . . . . 455/456 --
-- 6,064,888    A    5/2000    Lundqvist et al. . . . . . . . . . . . . 455/456 --
-- 6,108,558    A    8/2000    Vanderspool, II . . . . . . . . . . . . 455/456 --

Signed and Sealed this

Twenty-third Day of July, 2002

*Attest:*

*Attesting Officer*

JAMES E. ROGAN
*Director of the United States Patent and Trademark Office*